United States Patent
Chada et al.

(10) Patent No.: US 10,581,652 B1
(45) Date of Patent: Mar. 3, 2020

(54) SYSTEM AND METHOD FOR PAM-4 TRANSMITTER BIT EQUALIZATION FOR IMPROVED CHANNEL PERFORMANCE BEYOND 32 GBPS

(71) Applicant: DELL PRODUCTS, LP, Round Rock, TX (US)

(72) Inventors: Arun R. Chada, Pflugerville, TX (US); Jaydev M. Reddy, Austin, TX (US); Bhyrav M. Mutnury, Austin, TX (US); Jiayi He, Rolla, MO (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 16/400,906

(22) Filed: May 1, 2019

(51) Int. Cl.
*H03H 7/30* (2006.01)
*H04L 25/49* (2006.01)
*H04L 25/03* (2006.01)

(52) U.S. Cl.
CPC .... *H04L 25/4925* (2013.01); *H04L 25/03025* (2013.01)

(58) Field of Classification Search
CPC ........... H04L 25/4925; H04L 25/03025; H04L 25/03038; H04L 25/03057; H04L 2025/03617; H04L 2025/03477; H03H 21/0012
USPC ........ 375/232, 231, 230, 229, 316, 295, 219
See application file for complete search history.

(56) References Cited

U.S. PATENT DOCUMENTS

| | | |
|---|---|---|
| 6,452,461 B1 | 9/2002 | Su et al. |
| 8,573,089 B2 | 11/2013 | Nishino et al. |
| 9,148,198 B1 | 9/2015 | Zhang et al. |
| 9,935,682 B1 | 4/2018 | Chada et al. |
| 10,205,525 B1 * | 2/2019 | Cevrero .................... H03F 1/06 |
| 2005/0089126 A1 | 4/2005 | Zerbe et al. |
| 2008/0269003 A1 | 10/2008 | Bauknecht et al. |
| 2015/0085914 A1 | 3/2015 | Kizer et al. |
| 2015/0256363 A1 | 9/2015 | Shvydun et al. |
| 2016/0118121 A1 | 4/2016 | Kelly et al. |
| 2016/0149730 A1 | 5/2016 | Navid |
| 2018/0233853 A1 | 8/2018 | Janowiak et al. |

* cited by examiner

*Primary Examiner* — Zewdu A Kassa
(74) *Attorney, Agent, or Firm* — Larson Newman, LLP

(57) ABSTRACT

A serial data channel includes a transmitter that encodes serial data using a quaternary PAM-4 scheme, wherein the four PAM-4 signal levels include two balanced pairs of differential signal levels. The channel includes a de-emphasis circuit that determines that first and second symbols are in a first PAM-4 state, that a third symbol is in a second PAM-4 state, and provides a first de-emphasis to a voltage level of the second symbol in response to determining that the third symbol is represented as the second state. The de-emphasis circuit further determines that fourth and fifth symbols are in the second state, that a sixth symbol is in the first state, and provides a second de-emphasis to a voltage level of the fifth symbol in response to determining that the sixth symbol is represented as the first state. The first de-emphasis and the second de-emphasis represent different de-emphasis levels.

20 Claims, 6 Drawing Sheets

NRZ  410

412     414

PAM-4  420

422     424

SYSTEM AND METHOD FOR PAM-4 TRANSMITTER BIT EQUALIZATION FOR IMPROVED CHANNEL PERFORMANCE BEYOND 32 GBPS

FIELD OF THE DISCLOSURE

This disclosure generally relates to information handling systems, and more particularly relates to transmitter bit equalization for improved channel performance beyond 32 Gbps.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

SUMMARY

A serial data channel may include a transmitter that encodes serial data using a quaternary PAM-4 scheme. The four PAM-4 signal levels may include two balanced pairs of differential signal levels. The channel may include a de-emphasis circuit that determines that first and second symbols are in a first PAM-4 state, that a third symbol is in a second PAM-4 state, and provides a first de-emphasis to a voltage level of the second symbol in response to determining that the third symbol is represented as the second state. The de-emphasis circuit may further determine that fourth and fifth symbols are in the second state, that a sixth symbol is in the first state, and provide a second de-emphasis to a voltage level of the fifth symbol in response to determining that the sixth symbol is represented as the first state. The first de-emphasis and the second de-emphasis may represent different de-emphasis levels.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
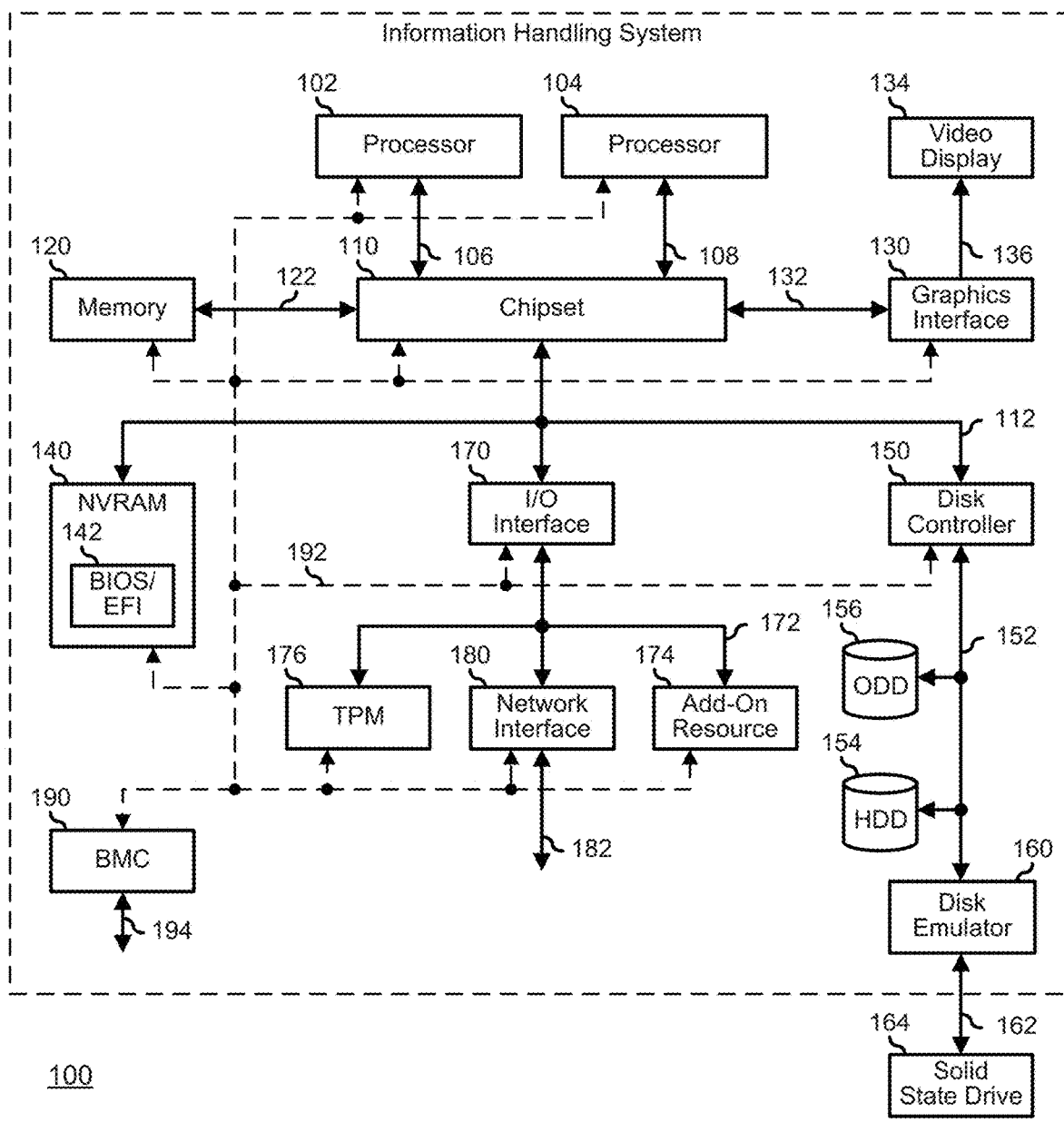
FIG. 1 is a block diagram of an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid state drive (SSD) 164, an input/output (I/O) interface 170 connected to an add-on resource 174 and a trusted platform module (TPM 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manages the data flows between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel and memory 120 represents one or more DDR Dual In-Line Memory Modules (DIMIVIs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a Peripheral Component Interconnect-Express (PCIe) interface and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface 180 translates information from a format suitable to the peripheral channel to a format suitable to external devices. In a particular embodiment, network interface 180 includes a network interface card (NIC) or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a WiFi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term baseboard management controller (BMC) is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system.

BMC 190 can operate in accordance with an Intelligent Platform Management Interface (IPMI). Examples of BMC 190 include an Integrated Dell Remote Access Controller (iDRAC). Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image. BMC 190 utilizes various protocols and application programming interfaces (APIs) to direct and control the processes for monitoring and maintaining the system firmware. An example of a protocol or API for monitoring and maintaining the system firmware includes a graphical user interface (GUI) GUI associated with BMC 190, an interface defined by the Distributed Management Taskforce (DMTF) (such as a Web Services Management (WS-MAN) interface, a Management Component Transport Protocol (MCTP) or, a Redfish interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100, or is integrated onto another element of the information handling system such as chipset 110, or another suitable element, as needed or desired. As such, BMC 190 can be part of an integrated circuit or a chip set within information handling system 100. An example of BMC 190 includes an integrated Dell remote access controller (iDRAC), or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

As the speed of high speed serial interfaces increases, variations in circuit design, component manufacture, environmental conditions, and other factors make it increasingly difficult to ensure highly reliable data transmission. In particular, transmitter and receiver equalization mechanisms to compensate for channel loss are calibrated on a best-effort basis, where settings that result in a "good enough" compensation solution are quickly obtained, in favor of iterative processes that might yield a more optimal solution, but which require an inordinate amount of time for such link training.

Figure 2:
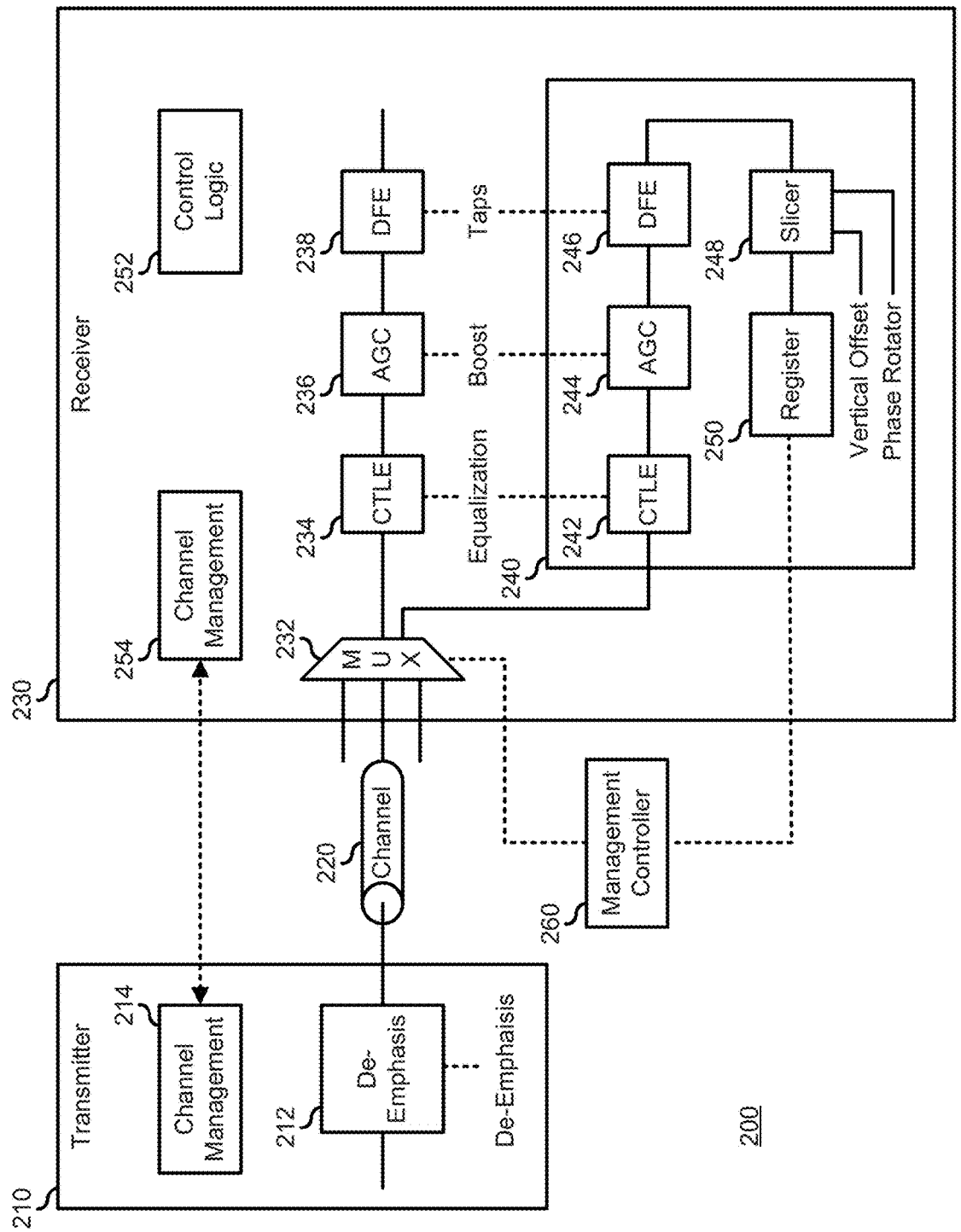
FIG. 2 illustrates a high speed serial interface according to an embodiment of the present disclosure.

FIG. 2 illustrates an embodiment of a high speed serial channel 200 of an information handling system, including a transmitter 210, a transmission channel 220, and a receiver 230. Serial channel 200 represents one half of a bi-directional serial data link for communicating data from transmitter 210 located at a first component to receiver 230 located at a second component. The other half of the bi-directional serial data link is similar to serial channel 200, but with a receiver in the first component, and a transmitter in the second component, for communicating data back from the second component to the first component. Here, the components can be understood to include elements within an information handling system, such as components that are attached to one or more printed circuit board of the information handling system, where transmission channel 220 can represent one or more circuit traces on the printed circuit board, and can include one or more connectors.

The components can also be understood to include devices of an information handling system, such as a hard drive, a storage array, and the like, that are separate from the printed circuit board of the information handling system, where transmission channel 220 can include one or more transmission cables. An example of serial channel 200 includes a PCI-Express (PCIe) channel that is in compliance with one or more PCIe specification, up to, and including the PCIe 4.0 Specification, a Serial ATA (SATA) channel that is in compliance with one or more SATA specification, up to, and including the SATA 3.2 Specification, a SAS channel that is in compliance with one or more SAS specification, up to and including the Serial Attached SCSI 4.0 Standard, or another high speed serial channel.

Serial channel 200 operates to provide back channel adaptation where transmitter 210 and receiver 230 communicate with each other to optimize and adjust various compensation values within the transmitter and the receiver to compensate for the insertion loss of transmission channel 220. A determination is made as to whether or not a set of compensation values is satisfactory based upon a determination of the bit error rate (BER) associated with the set of values. It is possible for multiple different sets of compensation values to result in acceptable BER in serial channel 200. Moreover, even on a particular information handling system, operating at different times, the back channel adaptation mechanism may operate to provide different sets of compensation values based upon minute variations in the operating conditions of the information handling system.

For example, a typical back channel adaptation operation can operate at a 10 gigabit per second (Gb/s) data rate, and can provide a training sequence of 2000 bits, such that the back channel adaptation operation takes 200 microseconds (µs), and serial channel 200 can operate to provide 1000 iterations of the back channel adaptation operation, such that the common set of compensation values is determined in 0.2 s. Using the common set of compensation values, serial channel 200 can adjust each value of the common set of compensation values by +/−1 setting value, and re-run the back channel adaptation operation in order to determine if the receiver eye is improved. Serial channel 200 can then select the set of values that produces the best receiver eye.

Transmitter 210 includes a de-emphasis module 212 and a channel management module 214. In operation, serial data is provided to de-emphasis module 212, and the de-emphasis module operates to provide a reduction in the signal levels of the serial data after a first data bit is transmitted, in order to de-emphasize the subsequent data bits and to transmit the de-emphasized serial data to receiver 230 via transmission channel 220. The amount of de-emphasis is determined based upon a de-emphasis setting. For example, transmitter 210 can support 21 de-emphasis settings which each prescribe a different amount of de-emphasis, from 0 dB to 10 dB, in 0.5 dB steps. Other numbers of settings and amounts of de-emphasis prescribed by the de-emphasis setting can be utilized, as needed or desired. Channel management module 214 will be described below.

Receiver 230 includes a multiplexor 232, a continuous time linear equalization (CTLE) module 234, an automatic gain control (AGC) module 236, a decision feedback equalization (DFE) module 238, a pseudo-latch 240, a control logic module 252, and a channel management module 254. In operation, the de-emphasized serial data is received by multiplexor 232, the multiplexor provides the received signal to CTLE module 234, and the CTLE module operates to provide compensation for inter-signal interference (ISI) in order to open the signal eye of the received signal. The amount of compensation is determined based upon an equalization setting. For example, receiver 230 can support 21 equalization settings which each prescribe a different amount of equalization, from 0 dB to 10 dB, in 0.5 dB steps. Other numbers of settings and amounts of equalization prescribed by the equalization setting can be utilized, as needed or desired The equalized signal is provided from CTLE module 234 to AGC module 236. AGC module 236 operates to provide linear gain to the signal received from CTLE module 234 to further open the signal eye of the received signal. The amount of gain is determined by a gain setting, and can support 21 gain settings which each prescribe a different amount of gain, for example, from 0 dB to 10 dB, in 0.5 dB steps. Other numbers of settings and amounts of gain prescribed by the gain setting can be utilized, as needed or desired.

The amplified signal is provided from AGC module 236 to DFE module 238. DFE module 238 operates to provide feedback based compensation to the received signal. The amount of compensation is determined by enabling a number of circuit feedback taps. For example, DFE module 238 can support up to 16 taps that provide compensation based upon up to 16 previous data points. In a particular embodiment, DFE module 238 can be turned off, thereby reducing the power consumed by receiver 230. In another embodiment, one or more tap of DFE module 238 can be turned on based upon the taps setting, while the rest of the taps are placed into a tri-state condition, that is, with power applied, but with the taps not providing feedback to the resultant DFE compensation. In yet another embodiment, one or more tap of DFE module 238 can be turned on based upon the taps setting, while the rest of the taps are turned off, thereby reducing the power consumed by receiver 230. Other numbers of taps can be utilized, as needed or desired.

Figure 3:
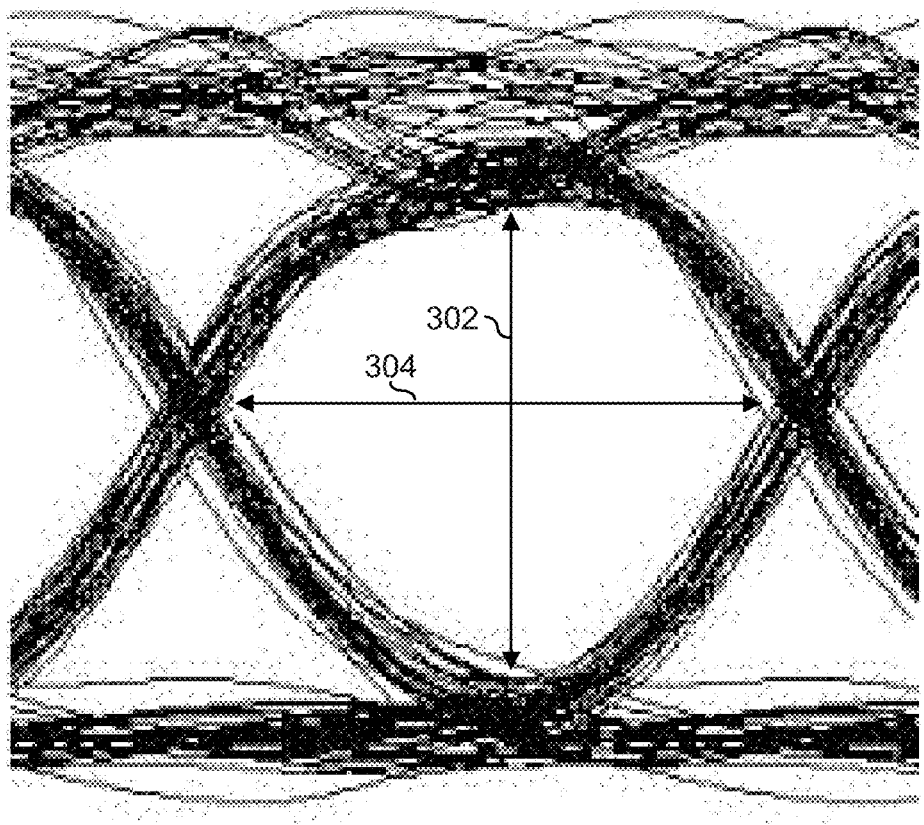
FIG. 3 illustrates a receiver eye diagram for the serial interface of FIG. 2.

In addition to providing the receive signal to CTLE module 234, multiplexor 232 provides the received signal to pseudo-latch 240 to characterize the receiver eye of the received signal. Pseudo-latch 240 provides a digital representation of the analog signal received by receiver 230, and analyzes the digital representation of the analog signal, such as the receiver eye 300 of FIG. 3, to determine the eye height 302 and the eye width 304 of the analog signal. Pseudo-latch 240 includes a CTLE module 242 similar to CTLE module 234, an AGC module 244 similar to AGC module 236, a DFE module 246 similar to DFE module 238, an adjustable slicer 248, and a register 250. CTLE module 242 is provided with the equalization setting, AGC module 244 is provided with the gain setting, and DFE module 246 is provided with the taps setting. In this way, pseudo-latch 240 operates to provide the same compensation for ISI as is provided in the main latch chain of CTLE module 234, AGC module 236, and DFE module 238, in order to open the signal eye of the received signal for further analysis, as described below.

Adjustable slicer 248 operates to select various timings and threshold levels for sampling the received and compensated signal from DFE module 246. As such, adjustable slicer 248 includes a phase rotator input which selects a timing offset for sampling the received and compensated signal, and a vertical offset input which selects a voltage offset for the detection threshold for determining the state of the received and compensated signal. At any given setting of the equalization setting, the gain setting, and the taps setting, the phase rotator input and the voltage offset input settings are adjusted, for example as "plus" and "minus" settings around a nominal phase and a nominal voltage offset associated with a slicer in in the main latch chain. The adjustment levels are increased and decrease sequentially until the signal becomes undetectable. By determining the offsets from the nominal phase and nominal voltage offset levels, pseudo-latch 240 determines the eye characteristics, that is, the eye height and the eye width of receiver 230 for the given settings of he equalization setting, the gain setting, and the taps setting.

Register 250 stores the eye height and eye width information in order to determine a set of compensation values that provides the best receiver eye for receiver 230. A management controller 260 operates to coordinate the determination of receiver eye information for multiple serial channels similar to serial channel 200. As such, multiplexor 232 operates to receive inputs from multiple transmission channels similar to transmission channel 220, and selectively routes the received signals to ADC module 242. In this way, a multi-channel device can include a single set of elements for determining the receiver eye information of multiple transmission channels.

In operation, control logic module 252 performs the back channel adaptation repeatedly, recording the set of compensation values for each iteration of the back channel adaptation in a memory of receiver 230, in order to determine a most common or most frequently recurring set of compensation values. In a particular embodiment, only the set of compensation values for receiver 230 are considered in determining the most frequently recurring set of compensation values. In another embodiment, the compensation values for both transmitter 210 and receiver 230 are considered in determining the most frequently recurring set of compensation values. In a particular embodiment, the memory includes a counter associated with each particular combination of compensation value settings, and each time a particular set of compensation values is derived, the counter is incremented. Then, when the iterations of the back channel adaptation are complete, control logic module 252 determines which counter includes the highest count. In another embodiment, receiver 230 includes a number of storage locations that is equal to the number of iterations, and on each successive iteration, the set of compensation values for that iteration are stored in the associated storage location. Then, when the iterations of the back channel adaptation are complete, control logic module 252 parses the values of the storage locations to determine the most common value.

Control logic module 252 then uses the most common set of compensation values as a seed for further optimization of the receiver eye, by directing each of de-emphasis module 212, CTLE module 234, AGC module 236, and DFE module 238 to iteratively adjust the respective compensation values by +/−one (1) setting value, and direct the received signal to through multiplexor 232 to ADC module 242 to determine the receiver eye height and eye width associated with each adjusted setting. Finally, the set of compensation values that resulted in the best eye height and eye width is utilized as the final run time set of compensation values.

Serial channel 200 operates based upon different communication speed settings that are each characterized by a different data rate. For example, where serial channel 200 represents a PCIe serial link, serial link may be operable at 250 mega-bytes per second (MB/s), 500 MB/s, 1 giga-bytes per second (GB/s), or 2 GB/s or faster. Further, each communication speed setting is associated with a particular line encoding scheme. For example, different communication speed settings can provide for different encodings of the received serial data on the serial channel, such as an 8-bit-10-bit encoding where eight (8) bits of serial data are encoded as ten (10) bits transmitted on transmission channel 220, or a 128-bit-130-bit encoding where 128 bits of serial data are encoded as 130 bits transmitted on the transmission channel. Such encodings operate to ensure clock synchronization between transmitter 210 and receiver 230.

Figure 4:
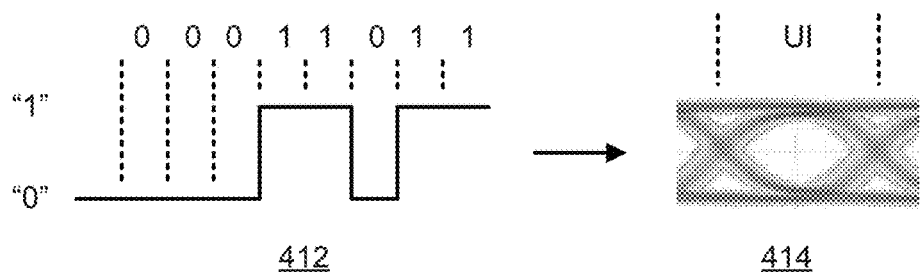
FIG. 4 illustrates signal level encoding schemes that can be implemented on the high speed serial channel of FIG. 2.
Figure 4:
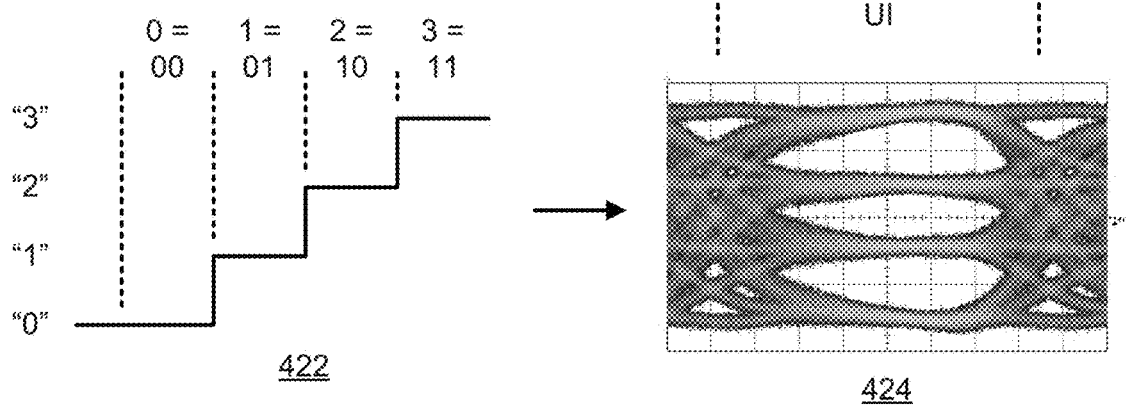

Each communication speed setting is further associated with a particular signal level encoding scheme, as shown in FIG. 4. In a first signal level encoding scheme 410, a binary (or two-level) non-return-to-zero (NRZ) encoding, the data signal transmitted on transmission channel 220 can have one of two different signal levels. Here, a digital "0" is encoded as a low state of the transmitted signal, and a digital "1" is encoded as a high state of the signal. A bit stream 412 as transmitted in binary-NRZ encoding illustrates the signal levels for the stream of serial data "0,0,0,1,1,0,1,1." Eye diagram 414 is typical of a data signal transmitted using binary-NRZ encoding. In another encoding scheme 420, a quaternary (or four-level) pulse amplitude modulation (PAM-4) encoding, the data signal transmitted on transmission channel 220 can have one of four different signal levels that each encode a particular 2-bit symbol. Here, the 2-bit sequence "00" is encoded as a low level, state "0," of the transmitted signal, the 2-bit sequence "01" is encoded as a first higher level, state "1," of the transmitted signal, the 2-bit sequence "10" is encoded as a next higher level, state "3," of the transmitted signal, and the 2-bit sequence "11" is encoded as a highest level, state "4," of the transmitted signal. A bit stream 422 as transmitted in PAM-4 encoding illustrates the signal levels "0,1,2,3," for data stream 412, that is, the stream of serial data "0,0,0,1,1,0,1,1." Eye diagram 424 is typical of a data signal transmitted using PAM-4 encoding. Note that where a particular signal level encoding scheme utilizes PAM-4 encoding, the clock rate of serial channel 200 may be half the clock rate of the a binary NRZ scheme and can still transmit the same amount of data because two bits of data are transmitted with each clock pulse. As such, PAM-4 encoding that operates at the same clock rate as a binary NRZ scheme has the potential to transmit twice the data as the binary NRZ scheme. Thus PAM-4 encoding is particularly suitable to higher bandwidth data transmission standards. Note that the 2-bit sequence encoding described above represents a particular embodiment, and that other mappings of the various 2-bit sequences onto the state levels of the PAM-4 encoding may be utilized as needed or desired.

Figure 5:
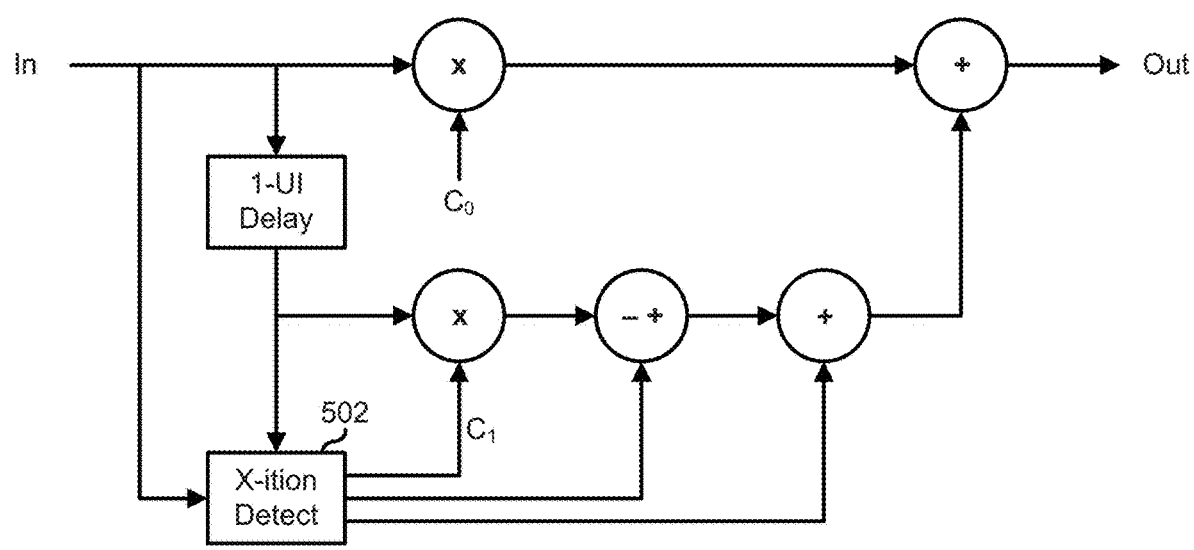
FIG. 5 is a block diagram of a transfer function for a quaternary pulse amplitude modulation (PAM-4) scheme on the high speed serial channel of FIG. 2 according to an embodiment of the present disclosure.

FIG. 5 illustrates a transfer function 800 for transmitter 210 that provides a de-emphasis scheme for PAM-4 encodings. Transfer function 500 operates to implement a feed forward equalization (FFE) scheme where de-emphasis is provided on each subsequent symbols after a first symbol is transmitted. Here, a serial data stream is inputted to transfer function 500 as a stream of data symbols. In a first clock pulse, denoted as a first unit interval (UI), a first order compensation level, $C_0$, is provided to a first data symbol, and the first data symbol is also provided to a delay unit that delays further operations on the first data symbol by 1-UI. In a second clock pulse, the first order compensation level, $C_0$, is provided to a second data symbol and a second order compensation level, $C_1$, is provided to the delayed first data symbol. The compensated delayed first data symbol is added to the compensated second data symbol to provide an output from transfer function 500.

Transfer function 500 includes a transition detector 502 in a second order compensation stream that adds a selectable correction factor $C_1$ and a polarity to counter the effect of the error factor that occurs when the transition is unbalanced, such as decreasing signal levels from level "3" to levels "2" or "1" or from levels "2" or "1" to level "0," or such as the opposite signal level increases. For example, when transition detector 502 detects a transition from level "2" to level "0," then the transition detector can add a selectable correction factor "E" that is associated with signal transitions from level "2" to level "1" to the output, such that, when the transition is complete, the output signal is equal to "−E," as desired. On the other hand, when transition detector 502 detects a transition from level "0" to level "2," then the transition detector can add a different selectable correction factor "H" that is associated with signal transitions from level "0" to level "2" to the output, such that, when the transition is complete, the output signal is equal to "H," as desired.

TABLE 2

Compensation values for signal transitions

| Transition | Compensation |
|---|---|
| 3 → 2 | A |
| 3 → 1 | B |
| 3 → 0 | C |
| 2 → 1 | D |
| 2 → 0 | E |
| 1 → 0 | F |
| 0 → 1 | G |
| 0 → 2 | H |
| 0 → 3 | I |
| 1 → 2 | J |
| 1 → 3 | K |
| 2 → 3 | L |

In a particular embodiment, a serial channel similar to serial channel 200 operates to perform back channel adaptation to uniquely determine a compensation value for each signal transition in order to provide an improved BER. Here, a transition detector similar to transition detector 802 determines not only a magnitude of the signal transitions (i.e., 3→0 vs. 3→1 vs. 3→2), but also determines a direction of the signal transitions (i.e., 3→1 vs. 1→3), and provides a different compensation value accordingly. Table 2, below, shows different compensation values for each transition. Here, while it may generally be the case that symmetric transitions would be expected to utilize similar compensation values, the determination of individual compensation values based upon the back channel adaptation may provide better compensation for transmission channels that are not perfectly balanced. Thus an amount of de-emphasis needed for a particular high-to-low transition may not be the same as an amount of de-emphasis needed for the opposite low-to-high transition.

Figure 6:
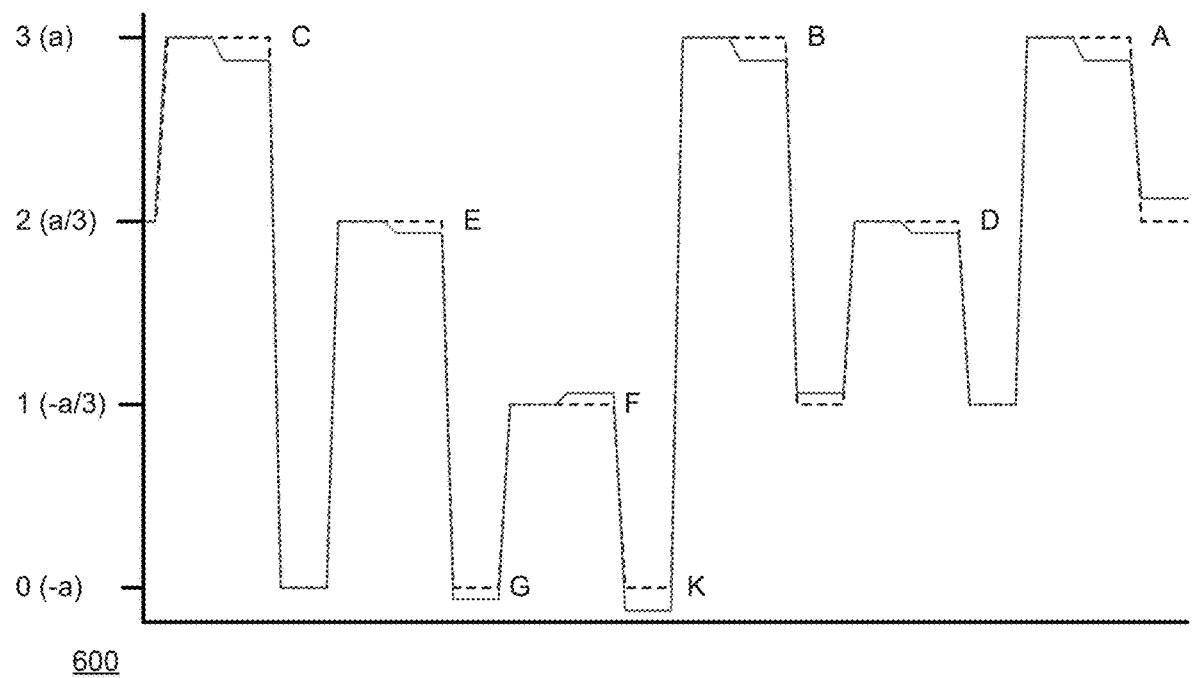
FIG. 6 is a state change diagram for the PAM-4 scheme of FIG. 5.

FIG. 6 illustrates a state change diagram for transfer function 500. The input signal stream is illustrated by the dashed line, the de-emphasized signal as provided by transfer function 500 is illustrated by the solid line.

Figure 7:
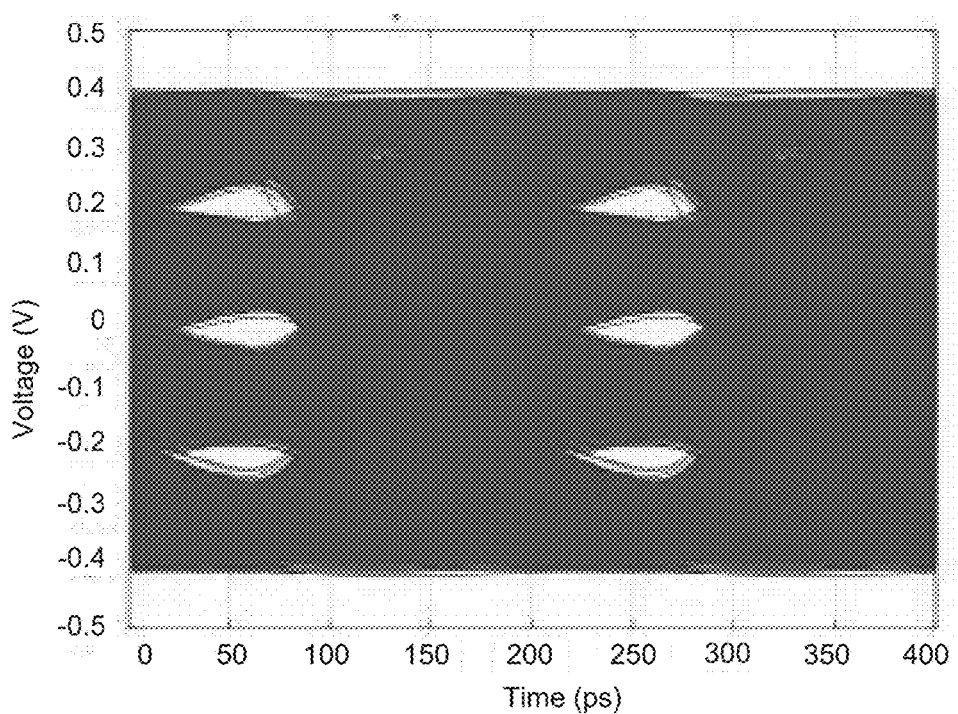
FIG. 7 is an eye diagram for the PAM-4 scheme of FIG. 5.

FIG. 7 shows an eye diagram 700 based upon modeled data associated with transfer function 500 and state change diagram 600. As with eye diagram 700, eye diagram 1000 is based upon a 30 Gb/s transfer rate. Note that at such a transfer rate, the eye opening associated with transfer function 500 is much more well defined, and would result in an acceptable BER.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A serial data channel, comprising:
   a transmitter to encode a serial data stream using a quaternary pulse amplitude modulation (PAM-4) scheme into a stream of 2-bit symbols, wherein a particular symbol is represented as a signal at one of four signal levels, and wherein the four signal levels include two balanced pairs of differential signal levels; and
   a hardware de-emphasis circuit to:
      determine that a first symbol of the encoded serial data stream is represented as a first instance of a first state of the PAM-4 scheme;
      determine that a second symbol of the encoded data stream is represented as a second instance of the first state;
      determine that a third symbol of the encoded serial data stream is represented as a first instance of a second state of the PAM-4 scheme;
      provide a first de-emphasis to a voltage level of the second symbol in response to determining that the third symbol is represented as the second state;
      determine that a fourth symbol of the encoded serial data stream is represented as a second instance of the second state;
      determine that a fifth symbol of the encoded data stream is represented as a third instance of the second state;
      determine that a sixth symbol of the encoded serial data stream is represented as a third instance of the first state; and
      provide a second de-emphasis to a voltage level of the fifth symbol in response to determining that the sixth symbol is represented as the first state, wherein the first de-emphasis and the second de-emphasis represent different de-emphasis levels.

2. The serial data channel of claim 1, wherein the first state is of a same balanced pair as the second state.

3. The serial data channel of claim 1, wherein the first state is of a different balanced pair as the second state.

4. The serial data channel of claim 1, wherein the hardware de-emphasis circuit comprises a two-tap feed forward equalization (FFE) circuit.

5. The serial data channel of claim 1, wherein the first de-emphasis and the second de-emphasis are each provided in one of 20 de-emphasis levels, each de-emphasis level prescribing a different amount of de-emphasis.

6. The serial data channel of claim 5, wherein the different amounts of de-emphasis comprise de-emphasis levels 0.5 dB to 10 dB, in 0.5 dB steps.

7. The serial data channel of claim 1, wherein the first de-emphasis and the second de-emphasis are selected in response to a determination by a receiver of the serial data channel that the first de-emphasis and the second de-emphasis operate on the serial data stream to provide a bit error rate (BER) at the receiver that is lower than a BER threshold.

8. A method for transmitting serial data from a transmitter of a serial data channel, the method comprising:
   encoding, by the transmitter, a serial data stream using a quaternary pulse amplitude modulation (PAM-4) scheme into a stream of 2-bit symbols, wherein a particular symbol is represented as a signal at one of four signal levels, and wherein the four signal levels include two balanced pairs of differential signal levels; and
   determining, by a hardware de-emphasis circuit of the transmitter, that a first symbol of the encoded serial data stream is represented as a first instance of a first state of the PAM-4 scheme;
   determining, by the de-emphasis circuit, that a second symbol of the encoded data stream is represented as a second instance of the first state;
   determining, by the de-emphasis circuit, that a third symbol of the encoded serial data stream is represented as a first instance of a second state of the PAM-4 scheme;
   providing, by the de-emphasis circuit, a first de-emphasis to a voltage level of the second symbol in response to determining that the third symbol is represented as the second state;
   determining that a fourth symbol of the encoded serial data stream is represented as a second instance of the second state;
   determining that a fifth symbol of the encoded data stream is represented as a third instance of the second state;
   determining that a sixth symbol of the encoded serial data stream is represented as a third instance of the first state; and
   providing, by the de-emphasis circuit, a second de-emphasis to a voltage level of the fifth symbol in response to determining that the sixth symbol is represented as the first state, wherein the first de-emphasis and the second de-emphasis represent different de-emphasis levels.

9. The method of claim 8, wherein the first state is of a same balanced pair as the second state.

10. The method of claim 8, wherein the first state is of a different balanced pair as the second state.

11. The method of claim 8, wherein the hardware de-emphasis circuit comprises a two-tap feed forward equalization circuit.

12. The method of claim 8, wherein the first de-emphasis and the second de-emphasis are each provided in one of 20 de-emphasis levels, each de-emphasis level prescribing a different amount of de-emphasis.

13. The method of claim 12, wherein the different amounts of de-emphasis comprise de-emphasis levels 0.5 dB to 10 dB, in 0.5 dB steps.

14. The method of claim 8, further comprising:
determining, by a receiver of the serial data channel, that the first de-emphasis and the second de-emphasis operate on the serial data stream to provide a bit error rate (BER) at the receiver that is lower than a BER threshold, wherein the first de-emphasis and the second de-emphasis are selected in response to the determination by the receiver.

15. A serial data channel, comprising:
a receiver; and
a transmitter to encode a serial data stream using a quaternary pulse amplitude modulation (PAM-4) scheme into a stream of 2-bit symbols, wherein a particular symbol is represented as a signal at one of four signal levels, and wherein the four signal levels include two balanced pairs of differential signal levels, the transmitter including a de-emphasis circuit to:
determine that a first symbol of the encoded serial data stream is represented as a first instance of a first state of the PAM-4 scheme;
determine that a second symbol of the encoded data stream is represented as a second instance of the first state;
determine that a third symbol of the encoded serial data stream is represented as a first instance of a second state of the PAM-4 scheme;
provide a first de-emphasis to a voltage level of the second symbol in response to determining that the third symbol is represented as the second state;
determine that a fourth symbol of the encoded serial data stream is represented as a second instance of the second state;
determine that a fifth symbol of the encoded data stream is represented as a third instance of the second state;
determine that a sixth symbol of the encoded serial data stream is represented as a third instance of the first state; and
provide a second de-emphasis to a voltage level of the fifth symbol in response to determining that the sixth symbol is represented as the first state, wherein the first de-emphasis and the second de-emphasis represent different de-emphasis levels;
the receiver to determine that the first de-emphasis and the second de-emphasis operate on the serial data stream to provide a bit error rate (BER) at the receiver that is lower than a BER threshold, wherein the first de-emphasis and the second de-emphasis are selected in response to the determination by the receiver.

16. The serial data channel of claim 15, wherein the first state is of a same balanced pair as the second state.

17. The serial data channel of claim 15, wherein the first state is of a different balanced pair as the second state.

18. The serial data channel of claim 15, wherein the hardware de-emphasis circuit comprises a two-tap feed forward equalization (FFE) circuit.

19. The serial data channel of claim 15, wherein the first de-emphasis and the second de-emphasis are each provided in one of 20 de-emphasis levels, each de-emphasis level prescribing a different amount of de-emphasis.

20. The serial data channel of claim 19, wherein the different amounts of de-emphasis comprise de-emphasis levels 0.5 dB to 10 dB, in 0.5 dB steps.

* * * * *